Sept. 24, 1968  H. SCHOLL  3,402,793
ELECTROMAGNETIC COUPLING ARRANGEMENT
Filed Sept. 26, 1966  5 Sheets-Sheet 1

INVENTOR
Hermann Scholl
by
Michael J. Striker

Sept. 24, 1968  H. SCHOLL  3,402,793
ELECTROMAGNETIC COUPLING ARRANGEMENT
Filed Sept. 28, 1966  5 Sheets-Sheet 4

INVENTOR
Hermann Scholl
by Michael J. Striker

United States Patent Office 3,402,793
Patented Sept. 24, 1968

3,402,793
ELECTROMAGNETIC COUPLING
ARRANGEMENT
Hermann Scholl, Stuttgart, Germany, assignor to Robert
Bosch, G.m.b.H., Stuttgart, Germany
Filed Sept. 28, 1966, Ser. No. 582,583
Claims priority, application Germany, Oct. 2, 1965,
B 83,973
13 Claims. (Cl. 192—.033)

ABSTRACT OF THE DISCLOSURE

An electromagnetic coupling arrangement for use in motor vehicles. The coupling arrangement has a driving coupling member and a driven coupling member for transmitting a torque between them. The driving member is mechanically linked to the engine of the motor vehicle. An electrical coil mounted on one of the coupling members establishes a magnetic field when energized. The magnetic field then acts to permit the transmission of torque between the coupling members. The magnitude of the torque transmitted is controlled by a pulsating current passed through the electric coil. The average intensity of the current determines the magnitude of the torque that may be transmitted between the coupling members. Electronic circuitry is provided for varying the waveform of the pulsating current passed through the electrical coil as a function of the operating characteristics of the engine. When the operating characteristic of the engine is the speed of the engine, the opening of the throttle is detected and the electronic circuitry is actuated in relation to the throttle opening. The current circulated through the electrical coil of the coupling is thus made a function of the engine speed.

---

The present invention relates to an electromagnetic coupling for motor vehicles, which is controlled by an electronic circuit so as to provide optimum operation of the coupling in conjunction with the vehicle engine.

In the prior art electromagnetic couplings, of the preceding species, are operated through the application of voltage pulses that are generated synchronously with the engine speed. The duration of these voltage pulses are maintained constant and independent of the various operating conditions of the motor vehicle. The voltage pulses generate a current through the coil of the electromagnetic coupling, and, as a result of the manner in which they are generated, the average value of the current through the coil is dependent only upon the engine speed. Under normal conditions, in the past, the average value of the current rises at first linearly with the engine speed, drops sharply beyond an upper limit of the engine speed, commences to rise again until the next drop is incurred, etc.

Experience has shown, however, that in order to realize optimum motor vehicle operation, it is desirable that the current through the coupling coil be a funtion of parameters in addition to the engine speed. It has been found, for example, that improved operation may be obtained when the current actuating the coupling is a function of the throttle position as well.

Accordingly, it is an object of the present invention to provide an electromagnetic coupling for motor vehicles, which is controlled so that the average value of the varying current actuating the coil of the coupling, permits the latter to transmit a torque somewhat greater than that delivered by the engine.

Another object of the present invention is to provide an electromagnetic coupling for motor vehicles, of the character described, wherein the voltage pulses, applied to the coil of the coupling for producing current therein, are generated as a function of the engine speed and the throttle position of the motor vehicle.

A further object of the present invention is to provide an electromagnetic coupling, as described, wherein the duration of the voltage pulses applied to the coil of the coupling, is a function of the engine speed.

A yet further object of the present invention is to provide an electromagnetic coupling for motor vehicles, as set forth, which operates in conjunction with compensating means whereby the average current through the coil of the coupling is independent of variation in the potential of the voltage source of the motor vehicle.

A still further object of the present invention is to provide an electromagnetic coupling for motor vehicles which is controlled, in the manner described, through the application of a simply constructed electronic circuit.

With the preceding objects in view, the invention comprises an electronic circuit connected to the distributor of the vehicle engine and to the coil of the electromagnetic coupling. The electronic circuit modifies the voltage pulses received from the engine distributor and applies the modified voltage pulses to the coil of the coupling so as to provide optimum operation thereof. The electronic circuit includes means for varying the pulse width or duration of the voltage pulses as a function of engine speed, and for further modifying the voltage pulses as a function of the position of the engine throttle. The circuit includes a monostable multivibrator for generating the pulses in the desired manner, and a voltage regulating action whereby the pulses generated by the electronic circuit are independent of the energizing source comprising the power supply of the motor vehicle.

The novel features which are considered as characteristic of the invention, are set forth in particular in the appended claims. The invention itself, however, both as to its construction and its method of operation together with additional objects and advantages thereof, will be best understood from the following description of specific embodiments when read in connection with the accompanying drawing in which:

Figure 5:
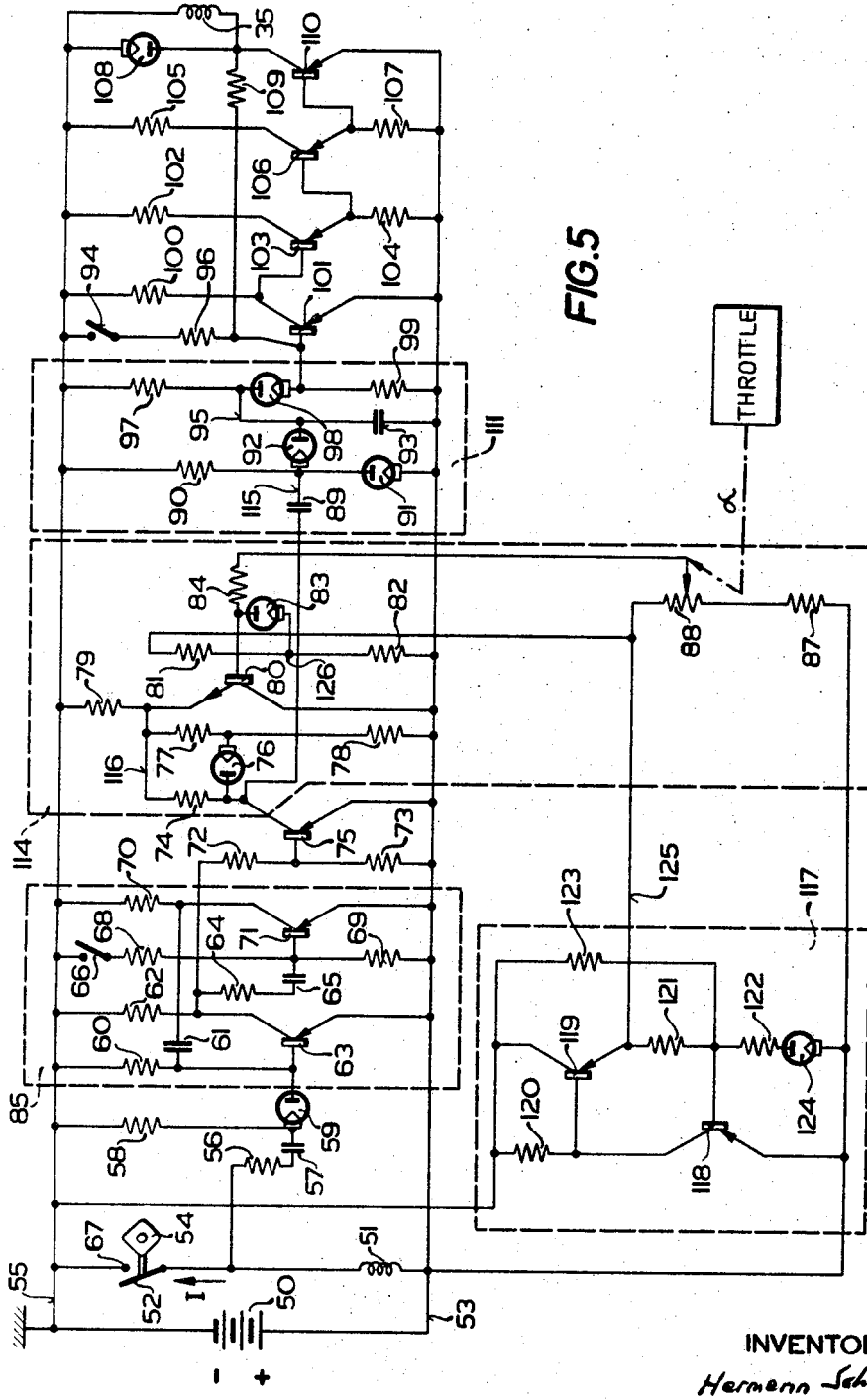
FIG. 5 is an electrical schemat'c d'agram of the electronic circuit which generates pulses and applies them to the coil of the electromagnetic coupling, to realize optimum operation of the motor vehicle.
Figure 6:
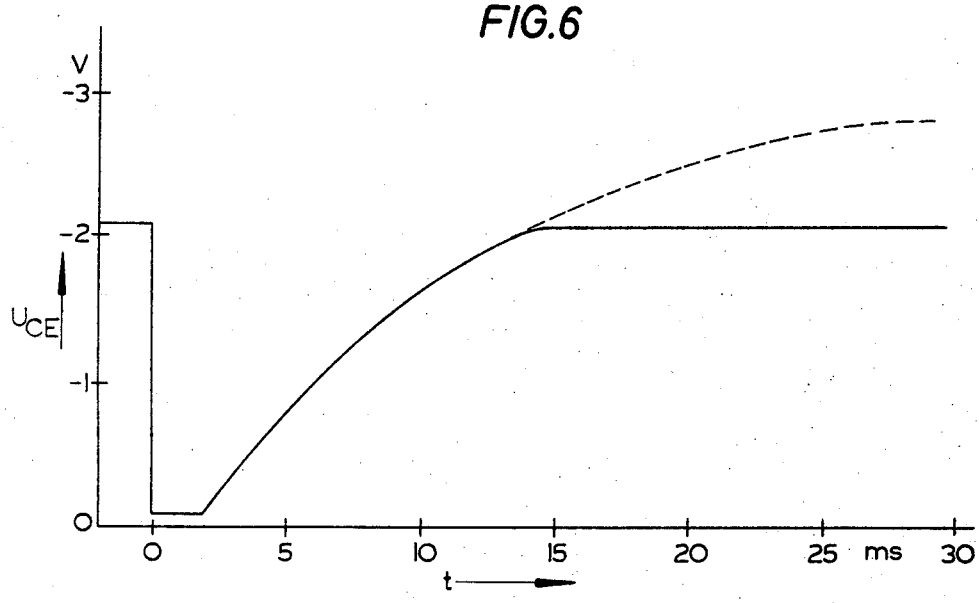
Figure 7:
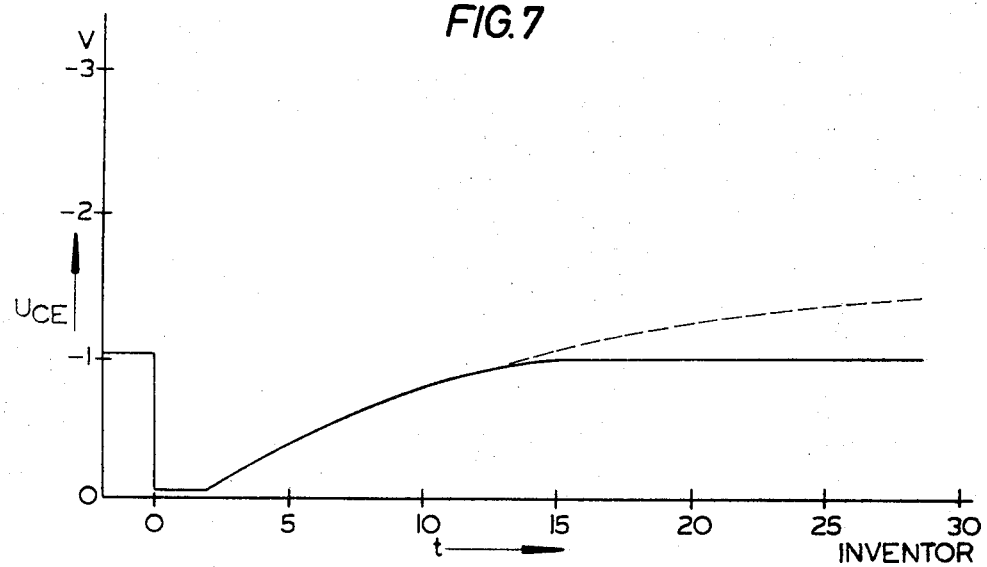

FIG. 6 is a graphical representation of the col'ector-emitter voltage of a particular transistor within the circuit of FIG. 5, as a function of time and for engine speeds less than 1800 r.p.m. at full load; and FIG. 7 is a graphical representation of the collector-emitter voltage of the transistor associated with FIG. 6, as a function of time and for engine speeds less than 1800 r.p.m., when in the idling condition.

Figure 1:
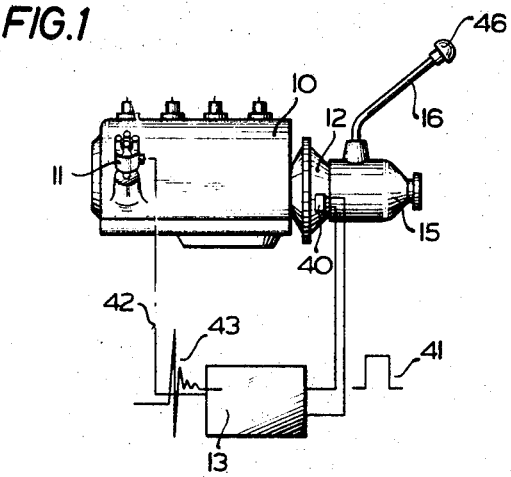
FIG. 1 is a functional schematic diagram showing the electromagnetic coupling operating in conjunction with a four cylinder engine and being controlled by an electronic circuit so as to provide optimum operation of the motor vehicle.

Referring to the drawing, and in particular to FIG. 1, the motor vehicle (not shown) is driven by means of an internal combustion engine 10 having a high voltage ignition system with distributor 11. The housing 12 of an electromagnetic coupling is secured to the engine 10. The electromagnetic coupling is controlled by a pulse generator 13 shown, in detail, in FIG. 5. The housing 12 of the electromagnetic coupling is also connected to the well known gear-shifting device 15 whose mode of operation may be selected by the shifting lever 16.

Figure 2:
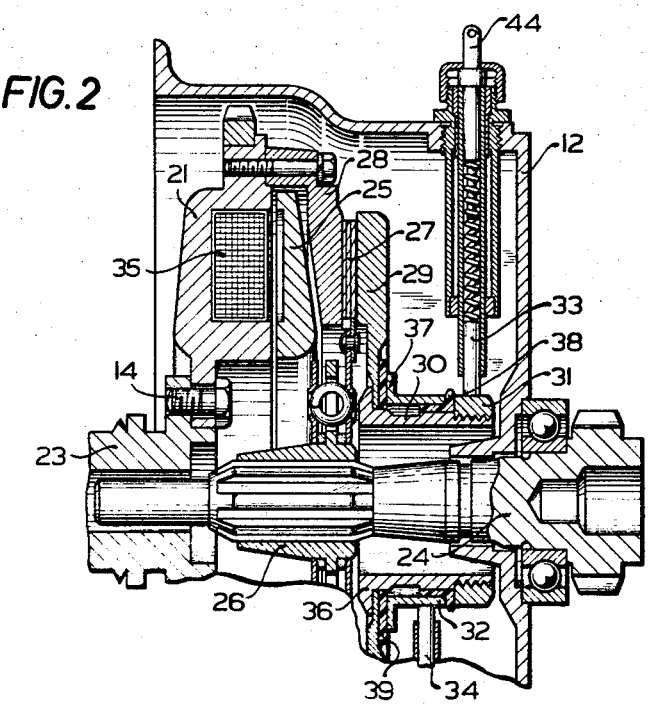
FIG. 2 is a fragmentary cross-sectional view of the electromagnetic coupling in FIG. 1, and shows the internal structural arrangement of the coupling.

The internal construction of the electromagnetic coupling is shown in FIG. 2 wherein the drive shaft, connecting the input of the electromagnetic coupling with the engine 10, is designated with the reference numeral 23. The output shaft of the coupling is designated by 24. A yoke 21 is connected to the input shaft 23 with bolts 14. The yoke is essentially of circular form having a cross section in the shape of a U. The yoke borders an annular space in which an electromagnetic coil 35 is situated. A movable armature 25, associated with the electromagnet of the coil 35, is arranged with respect to the yoke so that it is secured to the latter against angular movement. The armature 25 is, however, freely movable in relation to the electromagnet along the axial direction.

The hub 26 of a friction disc 27, is secured to the output shaft 24 by way of a keying arrangement. The hub 26 is elastically coupled to the friction disc 27. When the coupling is engaged, the friction disc 27 is gripped between the two members 28 and 29 secured to the yoke 21 and armature 25, respectively. The diameters of the members or discs 28 and 29, correspond to the diameters of the yoke and armature respectively. The disc 28 is firmly secured to the yoke 21, while the disc 29 is firmly secured to the armature 25.

An electrically conducting ring 30 has a shoulder 36, and is coaxially mounted with respect to the shaft 24. The ring 30 is secured to the disc 29 which is also of electrically conducting material, so that an electrical conducting path is established between these two members. The ring or bushing 30 carries two slip rings 31 and 32. The slip ring 31 comprises substantially a nut which is threadably received at the end of the ring 30 and is electrically connected therewith. The slip ring 32, on the other hand, comprises a ring with a shoulder 37, which is electrically isolated from the ring 30 through the application of the insulator 38. The arrangement is such that slip ring 32 is electrically isolated from slip ring 31. The slip ring 32 is also electrically isolated from the disc 29 due to the insulating disc 39 against the shoulder 37. The slip ring 32 and the yoke 21 are each connected to a separate terminal of the electromagnetic coil 35, by way of conductors not shown.

Two brushes 33 and 34 are in contact with the slip rings 31 and 32, respectively, and conduct electrical current to them. The brushes 33 and 34 are connected to terminals or electrodes at the exterior of the housing 12, through the path of the pressure applying springs and elements summarily designated as 40 in FIG. 1, and 44 in FIG. 2. The pulse generator 13 is connected to the brushes by way of these conducting elements and paths. Aside from this, the brush 33 is connected to ground or the common return of the motor vehicle.

The pulse generator 13 delivers the required electrical power in the form of rectangular voltage pulses one of which is designated in FIG. 1 as 41. The time constant of the coil 35, due to its resistance and inductance, is so large that a smoothing effect of the coupling current is realized even at low engine speeds. To produce the voltage pulse 41, the pulse generator 13 is connected to the distributor 11 by way of a cable 42. In this manner, the pulse generator 13 is provided with a control pulse 43 at every ignition instant.

The construction of the pulse generator 13 is shown in FIG. 5. The pulse generator 13 is energized from the battery 50 provided for the high voltage ignition system of the motor vehicle. The battery is connected to the generator by way of a lead 53 corresponding to +6 volts, and the lead 55 corresponding to the negative and grounded terminal of the battery. In describing the circuit of the generator, the plus terminal 53 is regarded as the reference potential.

The terminal 53 is connected to one end of the primary winding 51 of the ignition coil whose details are well known in the art and are, therefore, not repeated here. The other end of the primary winding 51 is connected to the interrupter arm 52 of the distributor 11. The interrupter arm 52 cooperates with a contact 67 connected to the negative terminal 55, and is actuated by the cam 54. The cam 54 is situated within the distributor housing and is designed with four humps so that the arm 52 is removed from contact 67 twice, for every revolution of the engine shaft. Aside from this, the interrupter arm 52 is connected to the negative potential 55 by way of the circuit path including resistor 56, capacitor 57 and resistor 58.

A diode 59, connected to the junction between capacitor 57 and resistor 58, leads to the base of transistor 63. The latter forms a multivibrator 85 in conjunction with the transistor 71. The base of the transistor 63 is joined to the negative potential 55 by way of resistor 60, as well as to the collector of transistor 71, through the path including capacitor 61. The emitter of transistor 63 is connected directly to the positive potential 53. The collector of transistor 63 leads to the negative potential 55 and the base of transistor 71, through the path including resistor 62, resistor 64 and capacitor 65, respectively. Aside from this, the base of transistor 71 also leads, through resistor 69, to the positive potential 53, as well as to the negative potential 55, by way of resistor 68 in series with switch 66. The switch 66, to be described in greater detail, is actuated as a function of the vehicle speed. The emitter of transmitter 71 is connected directly to the positive potential 53, whereas the collector of the transistor 71 is connected, through resistor 70, to the negative potential 55.

The pulses generated by the multivibrator 85 are routed from the collector of transistor 63 and directed to the base of the control transistor 75. A resistor 72 connects, for this purpose, the collector of transistor 63 to the base of transistor 75. The base of the latter is also connected to a resistor 73 which is, in turn, joined to the positive potential 53, whereas the emitter of the transistor 75 is directly coupled to this positive potential.

The potential of the collector of transistor 75 is varied, by the circuit 114, as a function of the throttle position α. The circuit 114 includes an N-P-N transistor 80. The collector of the control transistor 75 is joined to the negative potential 55, through the path including resistors 74 and 79. The junction 116 connecting resistors 74 and 79, is also connected directly to the emitter of transistor 80. The junction 116 is also connected to the positive potential 53 through the path including resistor 77 and 78. A diode 76 connects the junction between resistor 77 and 78 to the collector of the control transistor 75. The collector of transistor 80 is connected directly to the positive terminal 53. The base of the N-P-N transistor 80 leads to the sliding contact of a potentiometer 88, by way of the resistor 84. The sliding contact of the potentiometer 88 is mechanically coupled to the throttle, as shown by the dash-dot lines. One end of the winding of the throttle potentiometer 88 is connected, through resistor 87, to the positive potential 53. The other end of the winding of the throttle potentiometer 88, is connected to a voltage regulator 117 via the path 125. The voltage regulating circuit is designed so as to provide a stable four-volt potential when operating in conjunction with a vehicle battery 50 having an output level within the range of 5 to 8.5 volts. The path 125 is also joined to the positive potential 53, through the path of resistors 81 and 82. These two resistors, 81 and 82, form a voltage divider having a junction 126 which is connected, through diode 83, to the base of transistor 80.

The regulating circuit 117 includes two transistors 118 and 119, four resistors 120, 121, 122 and 123, and a diode 124. Leading from the positive potential to the negative potential 53 and 55, respectively, are the emitter-collector path of the transistor 118, and the resistor 120. In parallel with this circuit path is also the diode 124, the resistors 122 and 121, and the emitter-collector path of the transistor 119. The junction connecting the resistors 121 and 122 is, on one hand, connected to the base of transistor 118, and on the other hand, to the resistor 123 leading to the collector of transistor 119. The base of the latter is directly connected to the collector of transistor 118. The output level of the regulating circuit 117 is determined by the potential between the positive terminal 53 and the lead 125 connected to the emitter of transistor 119.

Connected to the circuit 114, is a circuit 111 including two capacitors 89 and 93, three diodes 91, 92 and 98, and three resistors 90, 97 and 99. The collector of the control transistor 75 is linked to the base of transistor 101 by way of the path including capacitor 89, junction 115, and diode 92, junction 95, and diode 98. Junction 95 is connected, on one hand, to the negative potential by way of resistor 97, and to the positive potential by way of capacitor 93. The base of transistor 101 leads to the positive potential 53 through the resistor 99. The junction 115 leads to the negative potential 55 through resistor 90, and to the positive potential 53 through diode 91. The relative directions of diodes 91 and 92 are as shown in FIG. 5.

The base of transistor 101 is linked to the negative potential 55, by way of the resistor 96 connected in series with the switch 94 which is closed when the knob 46 is gripped during operation. The emitter of transistor 101 is connected directly to the positive potential 53, whereas the collector is joined to the negative potential 55 through the resistor 100. The collector of the transistor 101 is, furthermore, connected to the base of a transistor 103 whose collector is coupled to the negative potential 55 by way of a resistor 102. The emitter of transistor 103 is, on the other hand, connected to the positive potential 53 by way of the resistor 104. The emitter of transistor 103 is also connected directly to the base of transistor 106 whose collector is similarly joined to the negative potential 55 through the resistor 105. The emitter of transistor 106 is joined to the positive potential 53 via a resistor 107, and also to the base of power transistor 110. The emitter of the power transistor 110 is connected directly to the positive potential 53, whereas the collector is connected to the negative potential 55 by either, the path including the coupling coil 35, or diode 108. Aside from this, the collector of transistor 101 is connected to the base of transistor 101, by way of resistor 109.

The circuit of FIG. 5 operates in the following manner:

Whenever the interrupter arm 52 interrupts the current I flowing through the primary winding 51 to the ignition coil, a positive voltage pulse is applied to the base of transistor 63, associated with the multivibrator 85, through the resistor 56, differentiating circuit 57–58 and diode 59. Provided the switch 66 is open, the multivibrator 85 is of the monostable type even though the capacitor 65, to be described, is present. In the quiescent state, transistor 63 conducts while transistor 71 is cut off. As a result of the positive voltage pulse applied to the monostable multivibrator 85, the latter is transferred to its unstable state where it remains for a period of approximately 2 milliseconds. This period of time is established by the resistor 60 and the capacitor 61. The control transistor 75 which is cut off in the quiescent state, becomes conducting during this period of time of the monostable multivibrator 85.

The collector potential of the transistor 75 is established by the throttle coupled to the potentiometer 88 and the limiting circuit comprised of elements 81, 82, 83 and 84. The sliding contact of the potentiometer 88 has a voltage output, when taken with respect to the positive terminal 53 of the power supply, which varies between −1.5 and −4 volts corresponding to idling conditions and full load, respectively. This variation in the voltage output of the sliding contact of potentiometer 88 is substantially linear with respect to the throttle position α.

Figure 3:
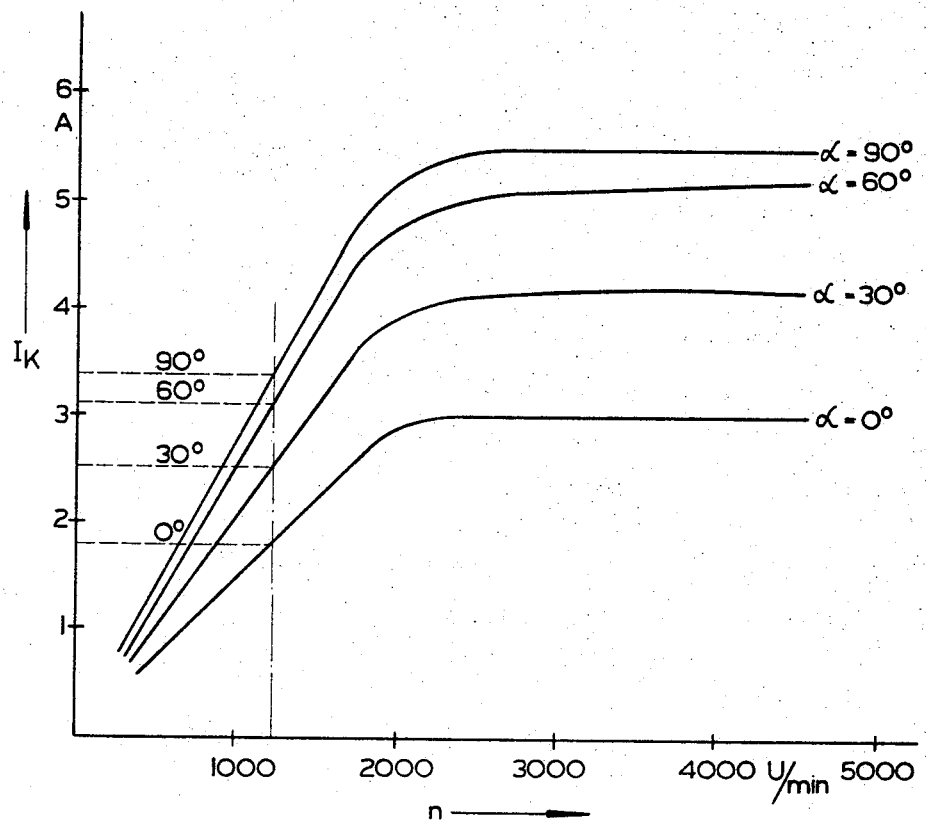
FIG. 3 is a graphical representation of the current through the coil of the electromagnetic coupling, as a function of the engine speed and throttle position, for optimum operation of the vehicle.

The base of the N-P-N transistor 80 has the same potential as the sliding contact of the potentiometer 88 within the range of idling condition and half load corresponding to half fuel-intake capacity. Within the range of half load and full load, the diode 83 whose anode is connected to the relatively low resistance voltage divider 81–82, becomes conducting. In this manner the variation in the base potential of the transistor 80 is reduced, with the result that the non-linear characteristics shown in FIG. 3, are exhibited.

The emitter potential of the transistor 80 is substantially equal to the latter's base potential. This potential is reduced to approximately 70% of its value by the low resistance voltage divider 77–78. Since the resistance of resistor 74 is substantially higher than that of resistor 77, the potential from the voltage divider 77–78 is essentially applied to the collector of the transistor 75. Accordingly, the collector potential of the cut-off transistor 75 and the potential at the left side of capacitor 89, are not linearly related to the throttle position α. In the event that the control transistor 75 becomes conducting, a positive voltage appears at its collector in the form of a step function. The level of this step voltage is approximately 2.1 volts and 1.1 volts, corresponding to full load and idling condition respectively. The condition of the circuit element to the right of capacitor 89, prior to the appearance of the preceding step voltage, is as follows:

The right side of capacitor 89 as well as the junction connecting diode 92 to capacitor 93, are essentially at zero potential. The transistor 101 is in the conducting state whereas the transistors 103 and 106, serving as power amplifiers, are cut off. The power transistor 110 is also cut off. Aside from this, it is necessary to note that the capacity of the condenser 89 is three to ten times as large as that of condenser 93. Aside from this it is also essential to note, for proper understanding of the circuit operation, that the switch 94 is open.

When the control transistor 75 becomes conducting, due to the aforementioned positive step voltage at its collector, the right side of the condenser 89 becomes positive. At the same time, the condenser 93 is charged substantially to the potential of the right side of the condenser 89 by way of the diode 92. The charging time of the condenser 93 is of relatively short duration. Due to the charging of the condenser 93, the diode 98 as well as the transistor 101 are cut off. As a result, the transistors 103, 106 and 110 become conducting, and current commences to flow through the coupling coil 35.

The capacitors 89 and 93 commence to discharge across the resistors 90 and 97, respectively, immediately upon the rise in potential at the collector of the control transistor 75. In view of the condition that the discharge time of the capacitor 89 is essentially smaller (approximately 2 milliseconds) than that of the capacitor 93 (approximately 15 milliseconds), the diode 92 is cut off after a short period of time after the potential rise. Accordingly, the capacitors 89 and 93 are completely independent of each other during their discharge times.

Figure 4:
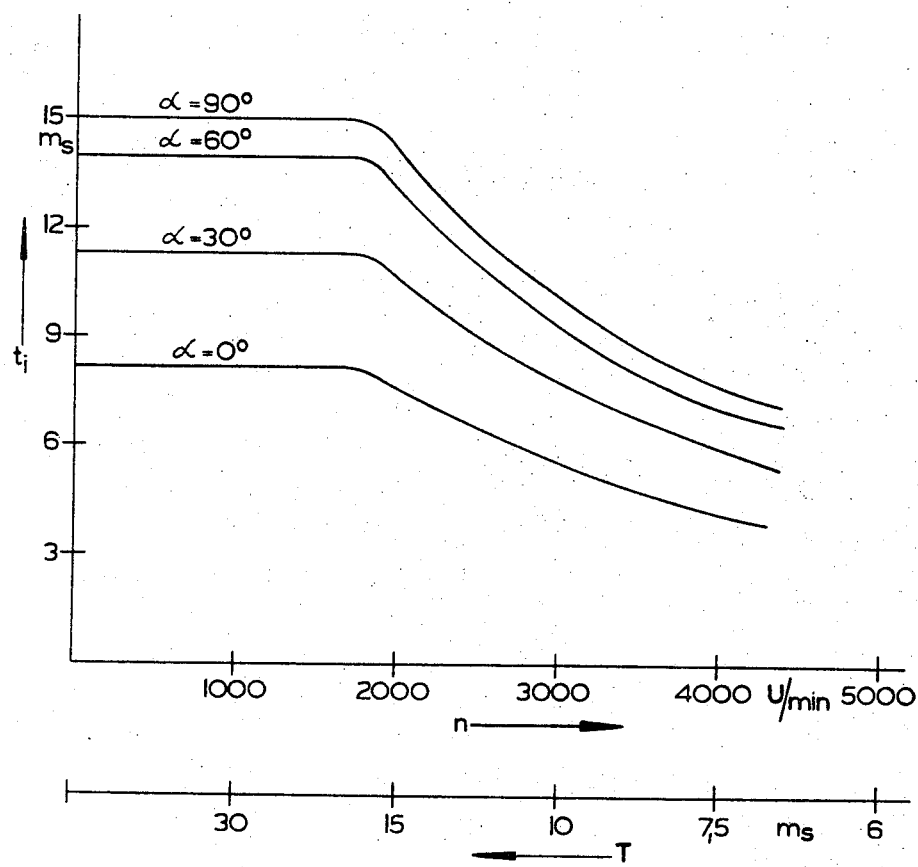
FIG. 4 is a graphical representation of the duration of the pulses applied to the coil of the coupling, as a function of the engine speed and throttle position, for optimum operation of the motor vehicle.

The duration of time $t_i$ during which the transistor 101 is cut off and transistors 103, 106 and 110 are conducting, is dependent upon the time constant determined by the capacitor 93 in conjunction with the resistor 97. This duration of time is also related, in a somewhat linear fashion, to the level of the step voltage applied to the capacitor 93. Since the step voltage applied to the capacitor 93 is dependent upon the throttle position α, the relationships between the throttle position α and the time interval $t_i$ as well as the coupling current $I_K$, are determined. The functional relationship of α versus $t_i$ is shown in FIG. 4. The relationship between α and $I_K$ is illustrated in FIG. 3.

The preceding considerations were based upon the assumption that the engine speed does not exceed 1800 r.p.m. In what follows, consideration will be given to the relationship of the time interval $t_i$ as a function of the engine speed $n$. In accordance with FIG. 4 the time interval $t_i$ experiences a drop in magnitude when the engine speed $n$ exceeds 1800 r.p.m. This drop in magnitude results from the condition that a large time constant of approximately 10 milliseconds is involved in the charging of capacitor 89 by way of the resistors 74 and 79. For purposes of presenting a more detailed illustration, FIG. 6 shows the relationship, at full load, of the collector-emitter voltage $U_{CE}$ of the transistor 75 as a function of time $t$. The graph of FIG. 6 is applicable to engine speeds not exceeding 1800 r.p.m.

The monostable multivibrator 85 becomes actuated at time $t=0$. As a result, the collector potential of transistor 75 rises from $-2.1$ to approximately $-0.1$ volt. During the period of time that the monostable multivibrator 85 is in its unstable state, the capacitor 89 becomes discharged through the resistor 90. After the elapse of a time interval of 2 milliseconds, the multivibrator 85 returns to its original or stable state and, accordingly, the control transistor 75 is cut off. The collector potential of the latter now varies exponentially, in a negative direction, with a time constant determined by the capacitor 89 and resistor 74. The asymptote of this exponential function is the emitter potential of the transistor 80, since the diode 76 is cut off. The emitter potential of the transistor 80 is, during this state, at approximately $-3$ volts. After an elapse of time $t$ of 15 milliseconds the diode 76 becomes conducting and thereby prevents any further increase in the negative direction. The sharp corner which one would normally expect, at this transfer of states, in the graphical plot, is rounded and made smooth by the non-linear characteristic of the diode.

When the engine speed is less than 1800 r.p.m., the scale of FIG. 4 shows that the time interval T is greater than 17 milliseconds. As a result, the monostable multivibrator 85 becomes actuated again after time $t$ greater than 17 milliseconds. The capacitor 89 is correspondingly charged to its maximum potential. Accordingly, the pulse duration $t_i$ exhibits its maximum value when the engine speed is less than 1800 r.p.m. If, on the other hand, the engine speed is greater than 1800 r.p.m, the time interval T is less than 17 milliseconds and the multivibrator 85 becomes actuated at a time $t$ less than 17 milliseconds. Under these conditions, the capacitor 89 has, not as yet, reached its maximum potential. The level of the step voltage is, therefore, reduced with increase in engine speed, and the pulse duration $t_i$ is also correspondingly reduced. Thus, the pulse duration $t_i$ is reduced approximately 50% when operating within the range of 1800 to 4000 r.p.m.

The collector-emitter potential of the control transistor 75 exhibits the same relationship, as a function of time, when the throttle is in its idling position. As shown by the graphical plot of FIG. 7, the voltage relationship is reduced in the ratio of 1:2, when compared to the lower voltage at the emitter of the transistor 80.

While a gear shift takes place, or the mode of operation is changed, the torque transmitted by the coupling must become null. Accordingly, the coupling current must be interrupted. This is achieved in the circuit through the transistor 101 which becomes conducting through the resistor 96 and switch 94. This state of the transistor 101, while the mode of operation is being changed, is independent of the previous state of the remaining circuit, and results in transistors 103, 106 and 110 becoming cut off.

The multivibrator 85 comprised of transistors 63 and 71, has, until now, been considered to be of the monostable type. When this multivibrator functions as a monostable one, the capacitor 65 serves the sole purpose of transferring transistor 71 to the conducting state. The capacitor 65 achieves this condition through its charging current during the period of time that the multivibrator is in its unstable state. If, now, the switch 66 becomes closed, the multivibrator 85 exhibits astable behavior, and one of the two timing circuits is determined by the capacitor 65 in conjunction with the resistor 68. The period of the freely oscillating multivibrator 85 is approximately 24 milliseconds, corresponding to an engine speed of approximately 1250 r.p.m.

The switch 66 is mechanically or electronically actuated as a function of the vehicle speed. For speeds exceeding 15 to 20 kilometers per hour, the switch is closed. When the switch 66 is closed, the multivibrator 85 operates in an astable mode provided that the engine speed does not exceed approximately 1250 r.p.m. This gives rise to the horizontally dotted lines shown in FIG. 3. In the event that the engine speed exceeds the value corresponding to astable operation of the multivibrator, the latter exhibits monostable behavior even though the switch 66 is closed.

As a result of this behavior of the pulse generator 13, the coupling is prevented from slipping in operation when the engine speed is small, and the vehicle is in high gear. As apparent from the relationship of FIG. 3, it is essential to control the coupling current in a relatively precise manner, in order to realize satisfactory vehicle operation. Since it is not practical to drive the coupling coil 35 from a stabilized voltage source, the realization of such required accuracy becomes doubtful when one considers the voltage variation that may arise from the power supply 50 available in the vehicle. In accordance with the present invention, however, this problem is eliminated in view of the fact that the voltage level of the lead or junction 125, for the throttle potentiometer 88, is stabilized at $-4$ volts.

This stabilizing feature is provided by the simply constructed circuit 117. The transistor 119 of the regulating circuit 117 offers a variable resistance to the current flowing from the negative potential source 55 to the lead 125. Accordingly, the transistor 119 determines the potential difference between the positive lead 53 and the lead 125. This potential difference is maintained constant with the aid of the series combination of diode 124 and resistors 121 and 122. The desired result is realized due to the condition that the junction of resistors 121 and 122 is connected to the base of transistor 118. Aside from this feedback control feature, forward control is also provided with the aid of the resistor 123. As a result of the latter which is connected to the vehicle battery 50 and to the base of transistor 118, any increase in the voltage of the battery causes the transistor 118 to become more conducting. The transistor 119 is, therefore, driven into the more non-conducting state, as a result of this operation. The effective resistance of transistor 119 is thus sharply lowered when the voltage of the vehicle battery 50 is in the vicinity of the lower limit of 5 volts.

As a result of the preceding stabilization or regulation feature, the step voltage for charging the capacitor 93 is not dependent upon the voltage level of the vehicle battery 50. The discharge function of the capacitor 93, however, is dependent upon the voltage level of the vehicle battery 50, since the discharge resistor 97 is connected to the negative terminal 55. The resulting effect of this condition is that the pulse duration $t_i$ becomes smaller with increase in the voltage level of the vehicle battery 50. With the pulse duration $t_i$ determined in this manner, the product of the voltage level of the vehicle battery 50 and the pulse duration $t_i$ is essentially constant, within the desired voltage range. As a result, the coupling current $I_K$ is also essentially independent of the voltage level of the vehicle battery 50.

While the invention has been illustrated and described as embodied in pulse generating circuits for internal combustion engines, it is not intended to be limited to the details shown, since various modifications and structural changes may be made without departing in any way from the spirit of the present invention.

Without further analysis, the foregoing will so fully reveal the gist of the present invention, that others can, by applying current knowledge, readily adapt it for various applications without omitting features that, from the standpoint of prior art, fairly constitute essential characteristics of the generic or specific aspects of this invention and, therefore, such adaptions should and are intended to be comprehended within the mean and range of equivalence of the following claims.

What is claimed as new and desired to be secured by Letters Patent is:

1. An electromagnetic coupling arrangement comprising, in combination, a driving coupling member; a driven coupling member; an electrical coil mounted on at least one of said coupling members for magnetically linking the same; means for passing a pulsating electric current through said electrical coil the average intensity of which determines the magnitude of the torque transmissible between said coupling members of said electromagnetic coupling; varying means for varying said average intensity of said pulsating current passing through said electrical coil by varying at least one of the characteristics of the pulses of said electric pulsating current; means for actuating said varying means in dependency on variations of at least one variable operational characteristic of said driving coupling means so that the average value of intensity of said electrical pulsating current is varied in accordance with such characteristic variation of said driving coupling member; a driving engine connected to said driving coupling member and providing driving torque to be transmitted between said driving and driven coupling members; throttle means connected to said driving engine for regulating the operation thereof, said throttle means being connected to said varying means for varying the duration of said pulses as a function of the disposition of said throttle means; electrical potentiometer means in said varying means and connected to said throttle means for providing a voltage signal indicative of the position of said throttle means; and a monostable multi-vibrator circuit and transistor in said varying means, said transistor being connected to the output of said monostable multivibrator circuit and to said potentiometer so that the potential of the collector of said transistor is varied in a non-linear manner in accordance with the position of said potentiometer and said throttle means.

2. An electromagnetic coupling arrangement comprising, in combination, a driving coupling member; a driven coupling member; an electrical coil mounted on at least one of said coupling members for magnetically linking the same; means for passing a pulsating electric current through said electrical coil the average intensity of which determines the magnitude of the torque transmissible between said coupling members of said electromagnetic coupling; varying means for varying said average intensity of said pulsating current passing through said electrical coil by varying at least one of the characteristics of the pulses of said electric pulsating current; means for actuating said varying means in dependency on variations of at least one variable operational characteristic of said driving coupling means so that the average value of intensity of said electrical pulsating current is varied in accordance with such characteristic variation of said driving coupling member; a driving engine connected to said driving coupling member and providing driving torque to be transmitted between said driving and driven coupling members; throttle means connected to said driving engine for regulating the operation thereof, said throttle means being connected to said varying means for varying the duration of said pulses as a function of the disposition of said throttle means; speed sensing means connected to said engine and to said varying means for varying the duration of said pulses as a function of the speed of said engine; a monostable multivibrator circuit in said varying means and actuated by said speed sensing means; control circuit means connected to said monostable multivibrator circuit and varying the duration of said pulses as a function of the speed of said driving engine and the position of said throttle means; pulse shaping and amplifying means connected to the output of said control circuit means for amplifying and shaping the pulses derived from said control means and adapt them for application to said electrical coil mounted on said coupling member; a voltage source for operating said varying means; and voltage regulating means for maintaining said pulses applied to said electrical coil substantially independent of voltage fluctuations of said voltage source.

3. An electromagnetic coupling arrangement according to claim 2, including means connected to said voltage regulating circuit for varying the duration of said pulses in relation to the fluctuations of said voltage source so as to compensate the characteristics of said pulses against voltage fluctuations of said voltage source and thereby maintain the average current through said electrical coil substantially independent of the fluctuations of said voltage source.

4. An electromagnetic coupling arrangement comprising, in combination, a driving coupling member; a driven coupling member; an electrical coil mounted on at least one of said coupling members for magnetically linking the same; means for passing a pulsating electric current through said electrical coil the average intensity of which determines the magnitude of the torque transmissible between said coupling members of said electromagnetic coupling; varying means for varying said average intensity of said pulsating current passing through said electrical coil by varying at least one of the characteristics of the pulses of said electric pulsating current; means for actuating said varying means in dependency on variations of at least one variable operational characteristic of said driving coupling means so that the average value of intensity of said electrical pulsating current is varied in accordance with such characteristic variation of said driving coupling member; a driving engine mechanically linked to said driving coupling member and providing driving torque to be transmitted between said driving and driven coupling members; speed sensing means connected to said engine and to said varying means for varying the duration of said pulses as a function of the speed of said engine; and adjusting means within said varying means and connected to said speed-sensing means for decreasing the duration of said pulses above a predetermined speed of said driving engine, and for maintaining the duration of said pulses substantially independent of the speed of said driving engine for speeds below said predetermined speed of said engine.

5. An electromagnetic coupling arrangement according to claim 4 including a resistor capacitor network connected to said adjusting means for shortening the duration of said pulses in relation to said engine speed above said predetermined speed.

6. An electromagnetic coupling arrangement for motor vehicles comprising, in combination, a driving coupling member; a driven coupling member; an electrical coil mounted on at least one of said coupling members for magnetically linking the same; a driving engine connected to said driving coupling member and providing driving torque to be transmitted between said driving and driven coupling members; throttle means connected to said driving engine for regulating the operation thereof; electrical potentiometer means connected to said throttle means and providing a voltage signal indicative of the position of said throttle means; a D.C. current source; circuit means connected between said D.C. current source and said electrical coil for applying to said coil electrical pulses having a frequency of repetition dependent upon the speed of said driving engine; power transistor means connected between said circuit means and said electrical coil for amplifying the pulses emitted by said circuit means; pre-amplifying transistor means operating in opposite phase to said power transistor means and controlling the same; control transistor means in said circuit means and controlling said pre-amplifier means; collector resistor means connected between the collector of said control transistor means and one terminal of said D.C.

current source; first capacitor means connected to the junction of the collector of said control transistor means and said collector resistor means; first rectifier means connected to said first capacitor means and the base of said pre-amplifying transistor means; biasing transistor means connected between the base of said pre-amplifying transistor means and said one terminal of said D.C. current source; second capacitor means connected between the base of said pre-amplifying transistor means and the other terminal of said D.C. current source; second rectifier means connected between the junction of said first capacitor means and said first rectifying means and said other terminal of said D.C. current source; operating resistor means connected between said collector resistor means and said one terminal of said D.C. current source; and auxiliary transistor means with emitter-collector path connected between said other terminal of said D.C. current source and the junction of said collector resistance means and said operating resistor means, the base of said auxiliary transistor means being connected to the output of said potentiometer means so as to receive from said potentiometer means a signal indicative of the position of said throttle means.

7. The electromagnetic coupling arrangement as defined in claim 6 including voltage dividing means connected in parallel with the emitter-collector path of said auxiliary transistor means, said voltage dividing means having a first voltage dividing resistor and a second voltage dividing resistor connected in series.

8. The electromagnetic coupling arrangement as defined in claim 7 including third rectifying means connected between the collector of said control transistor means and the junction of said first voltage dividing resistor and said second voltage dividing resistor.

9. The electromagnetic coupling arrangement as defined in claim 8 including voltage stabilizing means connected between said D.C. current source and said potentiometer means.

10. The electromagnetic coupling arrangement as defined in claim 9 where said D.C. current source comprises a battery adapted for motor vehicle operation.

11. The electromagnetic coupling arrangement as defined in claim 8 including additional voltage dividing means having a third voltage dividing resistor and a fourth voltage dividing resistor, said additional voltage dividing means being connected to said potentiometer means and said other terminal of said D.C. current source; diode means connected between the base of said auxiliary transistor means and the junction of said third voltage dividing resistor and said fourth voltage dividing resistor; and auxiliary resistor means connected between the base of said auxiliary transistor means and the output of said potentiometer means.

12. The electromagnetic coupling arrangement as defined in claim 11 wherein said voltage stabilizing means comprises a first transistor; a second transistor with its base connected to the collector of said first transistor; a stabilizing diode connected in parallel with the base emitter path of said first transistor; a first resistor connected to the collector of said first transistor and forming a series circuit with the emitter-collector path of said first transistor, said series circuit being connected in parallel with the terminals of said D.C. current source; a second resistor and a third resistor connected in series with said stabilizing diode and the emitter-collector path of said second transistor and forming an additional series circuit, said additional series circuit being connected in parallel with said terminals of said D.C. current source; connecting means for connecting the base of said first transistor to the junction of said second and third resistors; and a fourth resistor connected between the collector of said second transistor and the junction of said second resistor and said third resistor.

13. An electromagnetic coupling arrangement for motor vehicles comprising, in combination, a driving coupling member; a driven coupling member; a driving engine connected to said driving coupling member and providing driving torque to be transmitted between said driving and driven coupling members; an electrical coil mounted on at least one of said coupling members for magnetically linking the same; a D.C. current source; circuit means connected between said D.C. current source and said electrical coil for applying to said coil electrical pulses having a frequency of repetition dependent upon the speed of rotation of said driving engine; power transistor means connected between said circuit means and said electrical coil for amplifying said pulses applied to said coil; monostable multivibrator means in said circuit means and controlling the operation of said power transistor means; a driving transistor and a driven transistor in said monostable multivibrator means; first capacitor means connected between the base of said driving transistor and the collector of said driven transistor; a first resistor connected between the base of said driving transistor to one terminal of said D.C. current source; second capacitor means connected between the collector of said driving resistor and the base of said driven transistor; second resistor means connected to the base of said driven transistor; and switching means connected between said second resistor and said terminal of said D.C. current source, said switching means being actuated as a function of the speed of said motor vehicle, whereby said switching means is closed for greater motor vehicle speeds and is open for smaller motor vehicle speeds.

References Cited

UNITED STATES PATENTS

| | | | |
|---|---|---|---|
| 2,539,649 | 1/1951 | Winther | 192—.076 |
| 3,073,422 | 1/1963 | Baumann | 192—3.5 XR |
| 3,126,989 | 4/1964 | Baumann. | |
| 3,163,272 | 12/1964 | Baumann | 192—3.5 XR |
| 3,163,273 | 12/1964 | Maier | 192—3.5 XR |
| 3,239,038 | 3/1966 | Peras | 192—.076 |
| 3,258,094 | 6/1966 | Zechinall et al. | 192—84 |

MARTIN P. SCHWADRON, *Primary Examiner.*

C. LEEDOM, *Assistant Examiner.*